(12) United States Patent
Miyazaki

(10) Patent No.: US 6,905,288 B2
(45) Date of Patent: Jun. 14, 2005

(54) METHOD OF REMEDYING CONTAMINATED SOIL BY MICROORGANISM

(75) Inventor: Hideo Miyazaki, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/237,730

(22) Filed: Sep. 10, 2002

(65) Prior Publication Data

US 2003/0113903 A1 Jun. 19, 2003

(30) Foreign Application Priority Data

Sep. 10, 2001 (JP) .................................... P.2001-273757
Apr. 1, 2002 (JP) .................................... P.2002-098801

(51) Int. Cl.$^7$ ............................. B09C 1/10; C12N 1/14
(52) U.S. Cl. ............................. 405/128.75; 405/128.7; 405/128.45; 405/128.5; 435/262.5
(58) Field of Search ..................... 405/128.75, 128.5, 405/128.1, 128.7, 128.45; 435/262.5

(56) References Cited

U.S. PATENT DOCUMENTS

| | | | | |
|---|---|---|---|---|
| 4,274,954 A | * | 6/1981 | Blair | 210/611 |
| 4,655,924 A | * | 4/1987 | Heijnen | 210/603 |
| 5,252,483 A | * | 10/1993 | Lauff et al. | 435/262 |
| 5,340,376 A | * | 8/1994 | Cunningham | 71/6 |
| 5,348,803 A | * | 9/1994 | Schlaemus et al. | 428/402.2 |
| 5,658,795 A | * | 8/1997 | Kato et al. | 435/262.5 |
| 5,863,789 A | * | 1/1999 | Komatsu et al. | 435/262 |
| 5,932,472 A | * | 8/1999 | Abdullah | 435/262.5 |
| 5,962,305 A | * | 10/1999 | Mihara et al. | 435/262.5 |
| 5,965,024 A | * | 10/1999 | Van Ginkel et al. | 210/601 |
| 6,004,772 A | * | 12/1999 | Imamura et al. | 435/34 |
| 6,143,549 A | * | 11/2000 | Lamar et al. | 435/242 |
| 6,204,049 B1 | * | 3/2001 | Bennett et al. | 435/254.1 |
| 6,250,846 B1 | * | 6/2001 | Kawabata et al. | 405/128.45 |
| 6,287,846 B1 | * | 9/2001 | Dybas et al. | 435/262.5 |
| 6,331,300 B1 | * | 12/2001 | Dybas et al. | 424/93.4 |
| 6,383,797 B1 | * | 5/2002 | Lee | 435/252.4 |
| 6,403,364 B1 | * | 6/2002 | Hince | 435/262.5 |
| 6,472,198 B1 | * | 10/2002 | Semprini et al. | 435/262.5 |

FOREIGN PATENT DOCUMENTS

| | | | | |
|---|---|---|---|---|
| EP | WO 97/02217 | * | 1/1997 | ............. C02F/3/12 |
| JP | 58043782 A | * | 3/1983 | ............. C02F/3/34 |
| JP | 06296990 | * | 10/1994 | ............. C02F/3/02 |
| JP | 7-97573 A | | 4/1995 | |
| JP | 0646642 A2 | * | 5/1995 | ........... C12N/11/00 |
| JP | 7-136675 A | | 5/1995 | |
| JP | 409294994 A | * | 11/1997 | ............. C02F/3/08 |
| JP | 10-276579 A | | 10/1998 | |
| JP | 11-179337 A | | 7/1999 | |

OTHER PUBLICATIONS

Fravel, D. R., et al., "Encapsulation of potential biocontrol agents in an alginate–clay matrix," Phytopathology, 75:774–777, 1985.*

Schreiber Translations, English translation of JP 07–97573, Mar. 2003, whole document.*

Schreiber Translations, English translation of JP10–276579, Mar. 2003, whole document.*

Schreiber Translations, English translation of JP11–179337, Mar. 2003, whole document.*

Frieda B. Kolot, Ph. D., "Immobilized Microbial Systems: Principles, Techniques and Industrial Applications", Robert E. Krieger Publishing Company Malabar, Florida (1988) 7 pages.

* cited by examiner

Primary Examiner—Robert J. Sandy
Assistant Examiner—Katherine Mitchell
(74) Attorney, Agent, or Firm—Sughrue Mion, PLLC

(57) ABSTRACT

The present invention is a method of remedying contaminated soil comprises: providing microorganisms capable of degrading soil contaminants to contaminated soil, in which the microorganisms is supported on a carrier; and providing nutrients for the microorganisms to the contaminated soil on the condition that the nutrients can be gradually released, and a microorganism preparation for remedying soil.

9 Claims, 1 Drawing Sheet

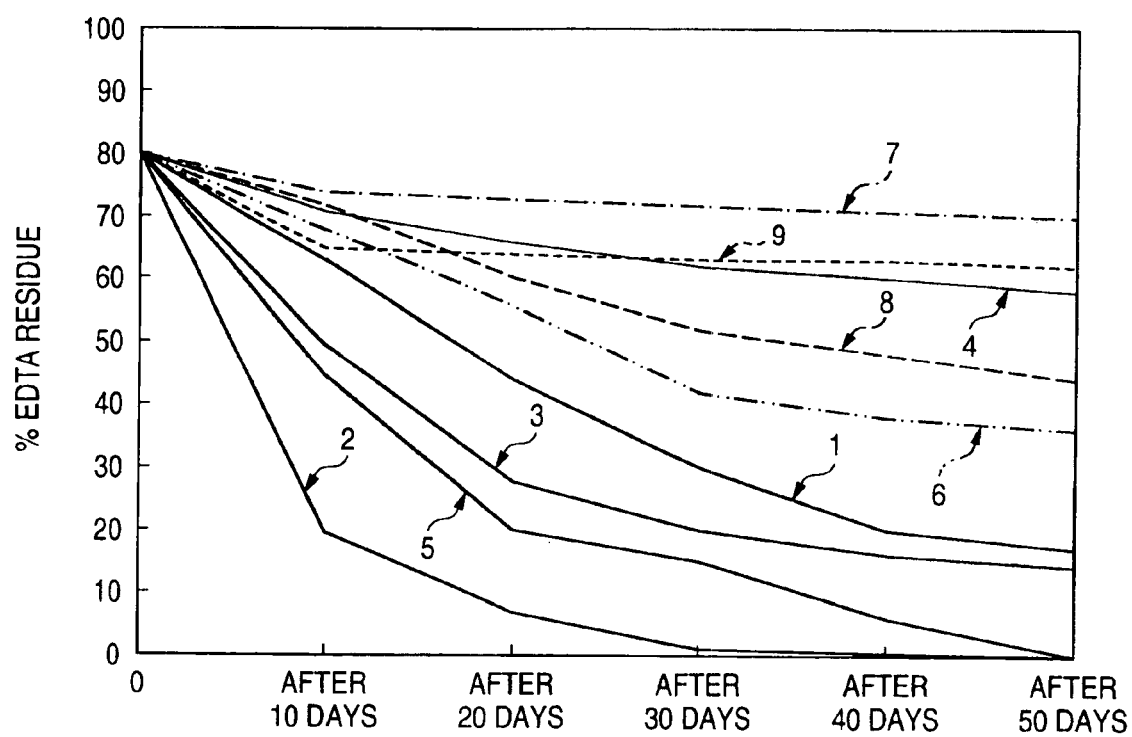
FIGURE

METHOD OF REMEDYING CONTAMINATED SOIL BY MICROORGANISM

FIELD OF THE INVENTION

The present invention relates to a method of remedying soil and more particularly to a method of remedying soil utilizing microorganisms capable of degrading soil contaminants, i.e., bioremediation.

BACKGROUND OF THE INVENTION

In recent years, various difficultly degradable harmful chemical materials have been detected in soil, rivers, sea, air, etc. The progress of contamination by these materials has caused problems. In particular, the contamination of soil by heavy metals or organic chlorine-based compounds has caused serious problems. It has thus been keenly desired to prevent the expansion of contamination as well as establish a technique of remedying polluted environment. For example, waste disposal site of chemical plants handling heavy metal compounds, gas production plants, oil refineries, fuel bases, pulp plants, etc. or site at which these plants used to be located are facing the problem of soil contamination. Thus, there is a growing demand for improvement and development of soil remedying method for purifying the contaminated soil.

Further, since contaminated soil not only prevents the reuse of land but also is much likely to allow the contaminants to flow and diffuse into underground water, causing the expansion of polluted area, it has been keenly desired to establish as soon as possible a technique for remedying contaminated soil.

As soil remediation methods for removing contaminants from contaminated soil to restore the soil to original state there have been known and attempted various methods.

For example, there are known physicochemical methods such as vacuum extraction method involving the suction of contaminants from soil. However, these physicochemical methods are disadvantageous in that they take much cost, have a lowered working efficiency and can difficultly dispose contaminants present in a low concentration.

Under these situations, among soil remediation methods, remediation by soil purification utilizing microorganisms, i.e., so-called bioremediation has been much expected of. As soil remediation methods utilizing microorganisms there have been attempted a method involving the enhancement of the activity of microorganisms originally occurring in soil to be treated and hence the autopurifying capacity of ecological system of degrading contaminants and rendering them harmless and a method involving an improvement of this technique, i.e., positive external introduction into soil of bacteria capable of degrading contaminants (hereinafter occasionally referred to as "contaminant-degrading bacteria" or simply "degrading bacteria") leading to the acceleration of remediation of contaminated soil.

Numerous difficultly degradable compounds causing soil contamination, e.g., microorganisms which degrade aromatic hydrocarbons and organic chlorine-based compounds have been known. However, if these bacteria are merely sprayed onto actual contaminated soil, the concentration of bacteria in the soil decreases from the initial vale with time, lowering the efficiency of remedy in the contaminated site. In order to prevent the drop of remediation efficiency, it is necessary that spray of microorganisms be often repeated, adding to labor and cost. Accordingly, it is practical to maintain the proliferating capacity of bacteria applied to soil and hence keep the concentration of bacteria high.

Thus, it has heretofore been proposed to apply to bioreactors aimed at remedying soil various microorganism carriers for retaining microorganisms therein in a high concentration. As such supporting carriers there are known particular carrier materials such as porous glass, ceramics, metal oxide, activated charcoal, zeolite and anthracite and gel-like carrier materials such as agar, polyvinyl alcohol, alginic acid, polyacrylamide and carrageenan.

For example, International Patent Publication No. 1992-503528 discloses a method involving the addition to contaminated soil chlorophenol-degrading microorganisms fixed in a porous carrier. This porous carrier forms an environment desirable for the growth of microorganisms, making it possible to protect microorganisms against the attack by predators.

However, soil is normally oligotrophic, making it occasionally necessary to provide the soil with materials which act as nutrients for soil remedying microorganisms (hereinafter referred to as "nutrients"). In this case, nevertheless, materials move in soil very slowly. Thus, even if nutrients for soil remedying microorganisms are given to soil from the surface thereof, there often occur nonuniformity or variation of nutrient concentration, making it difficult to exert desired effects. Accordingly, even if microorganisms are sprayed fixed on any carrier such as organic, inorganic, particulate, gel-like and porous carrier described above, not to mention if microorganisms are merely sprayed onto soil, the sufficient supply of nutrients to all microorganisms applied can be difficultly accomplished (unless applied excessively), leaving something to be desired in the maintenance of activation of proliferating capacity of applied microorganisms and high bacterium concentration in soil.

In order to overcome these difficulties, Japanese Patent Laid-Open No. 1994-212155 discloses a method involving the filling of pores in a porous carrier for supporting microorganisms with nutrients as an embodiment allowing nutrients to be supplied in such an arrangement that they can be sufficiently used by microorganisms. Further, Japanese Patent Laid-Open No. 1995-97573 discloses a method which comprises injecting into soil a liquid composition capable of forming a carrier for supporting microorganisms and containing nutrients to form a microorganism carrier containing nutrients that can be expected to make a uniform progress of soil purification. Moreover, Japanese Patent Laid-Open No. 1996-1181 discloses a method involving the incorporation of nutrients such as yeast extract in a polymer gel carrier with microorganisms. Japanese Patent Laid-Open No. 2001-501645 discloses a method involving the encapsulation of microorganisms and nutrients therefor in a water-absorbing polymer.

Although these related techniques apparently have some improvements in remediation of contaminated soil, the resulting effects are not sufficient. The reason for this insufficiency can be thought as follows. Even if the form of supply of nutrients is improved as mentioned above, the microorganisms depend on the nutrients applied so long as nutrients are supplied. Thus, the effectiveness of progress of soil improvement with contaminants in soil as nutrient sources is lowered. Further, microorganisms originally occurring in soil consume the nutrients thus supplied, causing remarkable consumption of nutrients and change of nutrient concentration. Moreover, microorganisms originally occurring in soil can inhibit the growth of microorganisms capable of remedying soil. In other words, the supply of nutrients is required for the maintenance of activity of microorganisms capable of remedying soil but comes up against a dilemma that it also lessens the effect of improving soil.

SUMMARY OF THE INVENTION

The invention has been worked out under these circumstances. An aim of the invention is to provide a soil remediation method using microorganisms, which allows microorganisms capable of remedying soil to grow in soil while being kept capable of remedying soil. In detail, an aim of the invention is to provide a soil remediation method which allows the microorganisms to exist in soil in a concentration required for soil remediation without deteriorating its capacity of remedying soil due to the supply of nutrients.

The inventors found that the aforementioned aim of the invention can be accomplished by meeting a first requirement that the microorganisms capable of remedying soil be supported on a carrier to grow in soil continuously over an extended period of time and a second requirement that nutrients be applied from the necessity of maintaining the activity of microorganisms on a level high enough for the survival and maintenance of activity of the microorganisms but low enough to prevent the deterioration of capacity of remedying soil. The embodiment of these requirements has been accomplished by the following inventions. The present invention is as follows.

1. A method of remedying contaminated soil, which comprises:

providing microorganisms capable of degrading soil contaminants to contaminated soil, in which the microorganisms is supported on a carrier; and providing nutrients for the microorganisms to the contaminated soil on the condition that the nutrients can be gradually released.

2. The method of remedying contaminated soil as defined in the item 1, wherein the carrier is biodegradable.

3. The method of remedying contaminated soil as defined in the item 1, wherein the nutrients are entrapped in a carrier material so that the nutrients can be gradually released.

4. The method of remedying contaminated soil as defined in the item 3, wherein the carrier material is biodegradable.

5. The method of remedying contaminated soil as defined in the item 1, wherein the microorganisms capable of degrading soil contaminants include microorganisms capable of degrading at least one selected from the group consisting of EDTA, phenols and a surface active agent.

6. The method of remedying contaminated soil as defined in the item 1, wherein the microorganisms is supported on the carrier by at least one method of:

a vital membrane method of using the carrier capable of attaching the microorganisms to form a microorganism layer; and an entrapping method of entrapping the microorganisms in gel as the carrier.

7. The method of remedying contaminated soil as defined in the item 6, wherein the microorganisms is supported on the carrier by the entrapping method of entrapping the microorganisms in gel as the carrier.

8. The method of remedying contaminated soil as defined in the item 7, wherein the carrier in the entrapping method is an acrylamide gel.

9. The method of remedying contaminated soil as defined in the item 2, wherein the biodegradable carrier contains at least biodegradable polymer material.

10. The method of remedying contaminated soil as defined in the item 2, wherein the biodegradable carrier is one of cellulose-containing carrier material and carrier material comprising at least one of chitosan and chitin.

11. The method of remedying contaminated soil as defined in the item 1, wherein the carrier supporting the microorganisms capable of degrading soil contaminants has a form of a particle.

12. The method of remedying contaminated soil as defined in the item 11, wherein the carrier particle supporting the microorganisms capable of degrading soil contaminants has the outer diameter of from 0.1 mm to 70 mm.

13. A microorganism preparation for remedying soil comprising:

a carrier supporting microorganisms capable of degrading soil contaminants; and a sustained-release preparation for delivering nutrients, which contains nutrients for the microorganisms so that the nutrients can be gradually released.

14. The microorganism preparation for remedying soil as defined in the item 13, wherein the carrier is biodegradable.

15. The microorganism preparation for remedying soil as defined in the item 13, wherein the nutrients are entrapped in a carrier material so that the nutrients can be gradually released.

16. The microorganism preparation for remedying soil as defined in the item 15, wherein the carrier material is biodegradable.

17. The microorganism preparation for remedying soil as defined in the item 13, wherein the microorganisms capable of degrading soil contaminants include microorganisms capable of degrading at least one selected from the group consisting of EDTA, phenols and a surface active agent.

18. The microorganism preparation for remedying soil as defined in the item 14, wherein the biodegradable carrier contains at least biodegradable polymer material.

19. The microorganism preparation for remedying soil as defined in the item 14, wherein the biodegradable carrier is one of cellulose-containing carrier material and carrier material comprising at least one of chitosan and chitin.

20. The microorganism preparation for remedying soil as defined in the item 13, wherein the carrier supporting the microorganisms capable of degrading soil contaminants has a form of a particle.

21. The microorganism preparation for remedying soil as defined in the item 20, wherein the carrier particle supporting the microorganisms capable of degrading soil contaminants has the outer diameter of from 0.1 mm to 70 mm.

In other words, the essences of the invention are the supporting of microorganisms capable of remedying soil on a carrier and the gradual release of nutrients that allows the supply thereof to be maintained to a low level and with a low change such that the maintenance of activity of microorganisms and the inhibition of drop of efficiency in soil remediation can be attained at the same time. The use of a carrier makes it possible to raise the concentration of microorganisms in contaminated soil. The supply of nutrients by gradual release makes it possible to prevent lack of nutrients even if the concentration of microorganisms is high and control the rate of supply of nutrients within a range such that the desired capability of degrading contaminants can be maintained. Further, when the carrier for supporting microorganisms is biodegradable, soil thus remedied is more environment-friendly.

As the process for gradually releasing nutrients there may be used encapsulation to advantage in particular. Encapsulation is also practical from the standpoint of working efficiency. When the carrier material to be used in the encapsulation of nutrients, too, is biodegradable, soil thus remedied is more environment-friendly as in the aforementioned case.

The soil remedying method of the invention involves the use of so-called EDTA-degrading microorganisms capable of biodegrading a difficultly degradable aminopolycarboxylic acid-based metal chelating agent such as EDTA or heavy metal chelate obtained by complexing such a metal chelating agent with a heavy metal to exert a remarkable effect particularly on the remediation of soil contaminated by the aforementioned heavy metal chelate or chelating agent. These chelates and chelating agents are difficultly degradable and thus can be difficultly decomposed in ordinary soil remedying methods. However, the method of the invention, i.e., soil remedying method of the invention involving the use of a carrier allowing the rise of concentration of microorganisms and the gradual release of nutrients allowing the limitation of supply of nutrients to microorganisms exerts an effect on the degradation of these chelates and chelating agents.

Further, the soil remedying method of the invention involves the application of supported phenol-degrading bacteria or surface active agent-degrading bacteria to soil contaminated by a phenol compound with which soil bacteria can difficultly grow or a difficultly degradable surface active agent together with a nutrient sustained-release preparation (a nutrient slow drug) to exert a soil remedying effect.

As a specific embodiment of application of the method of the invention to contaminated soil, a method involving the employment of soil remedying microorganism preparations comprising a carrier having microorganisms supported thereon and a nutrient sustained-release preparation (a nutrient slow drug) which contains nutrients for microorganism in such an arrangement that they can be gradually released, enables easy control over microorganisms and is energy-saving and practical in soil remedying process. In particular, as a means of allowing gradual release there may be practically used a nutrient slow drug involving a entrapping method. The term "a entrapping method" as used herein is as ordinarily defined in JIS K3600. In some detail, a biocatalyst such as bacteria may be taken into a polymer gel. Alternatively, a biological fixing method involving microcapsulation of the biocatalyst in a film or the like may be used. For details of these entrapping methods, reference can be made to "Kagaku Binran (Handbook of Chemistry)", Edition of Applied Chemistry II, compiled by The Chemical Society of Japan, page 1,197.

BRIEF DESCRIPTION OF THE DRAWING

FIG. 1 is a graph illustrating the results of test on 9 samples of Example 1.

The invention will be further described hereinafter.

DETAILED DESCRIPTION OF THE INVENTION

[Microorganisms Capable of Degrading Soil Contaminants]

Microorganisms capable of degrading soil contaminants to be supported on the carrier of the invention are not specifically limited so far as they are capable of biodegrading the contaminants. In practice, however, bacteria belonging to *Pseudomonas* capable of degrading aromatic hydrocarbon-based compounds (e.g., phenols), organic solvents (e.g., toluene, trichloroethylene), organic chlorine compounds (e.g., dioxin, PCB), etc. maybe used. Besides these bacteria, microorganisms belonging to *Methylosinus, Methylomonas, Methylobacterium, Hethylocystics, Alcaligenes, Mycobacterium, Nitrosomonas, Xanthomonas, Spirillum, Vibrio, Bacterium, Achrombacter, Acinetobacter, Flavobacterium, Chromobacterium, Desulfovibrio, Desulfotomaculum, Micrococcus, Sarcina, Bacillus, Streptomyces, Nocardia, Corynebacterium, Pseudobacterium, Arthrobacter, Brevibacterium, Saccharomyces* and *Lactrobacillus*, which are known to be capable of degrading various harmful materials including the aforementioned compounds may be used.

Further, a metal chelating agent such as EDTA and a heavy metal chelate obtained by complexing such a metal chelating agent with a heavy metal, too, are materials inducing contamination of soil. Examples of microorganisms capable of degrading these materials include bacteria belonging to *Bacillus* such as *Bacillus editabidus, Bacillus subtilis, Bacillus megaterium* and *Bacillus sphaericus*. These bacteria can be easily available as, e.g., *Bacillus editabidus*-1 (National Institute of Advanced Industrial Science and Technology, FERM P-13449), *Bacillus subtilis* NRIC 0068, *B. megaterium* NRIC 1009, *B. sphaericus* NRIC 1013, etc.

Other examples of microorganisms capable of degrading EDTA include *Pseudomonas* and Alkaligenes described in Japanese Patent Laid-Open No. 1983-43782, bacteria belonging to *Agrobacterim* described in "Applied and Environmental Microbilogy", vol. 56, pp. 3346–3353, 1990, and Gram-negative isolate described in "Applied and Environmental Microbilogy", vol. 58, No. 2, February 1992, pp. 671–676. Among these microorganisms, *Pseudomonas editabidus* is available as *Pseudomonas editabidus*-1 (FERM P-13634).

Further examples of microorganisms capable of degrading EDTA include *Bacillus editabidus* and *Mesophilobac editabidus*, which are oceanic bacteria. This organic aminocarboxylic acid-degrading bacterium *Bacillus editabidus* belongs to *Bacillus editabidus*-M1 (FERM P-14868) or *Bacillus editabidus*-M2 (FERM P-14869). The organic aminocarboxylic acid-degrading bacterium *Mesophilobacter editabidus* belongs to *Mesophilobacter editabidus*-M3 (FERM P-14870).

Examples of microorganisms capable of degrading phenols or cresol compounds include *Pseudomonas putida* cb-173 (ATCC 31800) described in U.S. Pat. Nos. 4,352,886 and 4,556,638. Examples of contaminated soil to which these microorganisms are applied include soil contaminated by waste water from phenolic resin plant, waster water from cresol resin plant and waste water containing phenols obtained from bisphenol A, and phenol-containing waste water from plate-making process or photoresist-forming process involving the use of these phenolic resins.

Examples of surface active agent-degrading bacteria include *Pseudomonas fluorescence* 3p (ATCC 31483) described in U.S. Pat. No. 4,274,954. Examples of contaminated soil to which these microorganisms are applied include soil contaminated by waste water containing anionic, nonionic and cationic surface active agents, particularly difficultly-biodegradable surface active agents called hard surface active agents, more particularly sulfonic acid group-containing surface active agents.

Examples of the form of microorganisms to be applied include bacteria which have been already isolated, bacteria which have been newly screened from soil or the like depending on the purpose, and mixture of a plurality of strains. Microorganisms which have been isolated by screening may be used unidentified.

[Carrier and Method for Supporting Microorganisms]

The carrier and method for supporting microorganisms will be described hereinafter.

As the carrier for supporting microorganisms there may be used any known material so far as it can be applied to contaminated soil with microorganisms supported thereon. From the standpoint of effective supporting of useful microorganisms, carrier materials which can firmly adsorb microorganisms to the surface thereof, porous carrier materials which allow microorganisms to penetrate into micropores to enhance retention and carrier materials which allow agglomeration of grains thereon to substantially increase the adsorption or occlusion area are desirable.

Specific examples of the carrier material include polysaccharides such as cellulose, dextran and agarose, unactivated proteins such as colagen, gelatin and albumin, synthetic polymer compounds such as ion-exchange resin and polyvinyl chloride, inorganic materials such as ceramic and porous glass, natural carbon hydrates such as agar, alginic acid and carrageenan, and polymer compounds to be used in encapsulating carrier such as cellulose acetate, polyacrylamide, polyvinyl alcohol, epoxy resin, photo-setting resin, polyester, polystyrene and polyurethane.

Alternatively, carrier materials made of lignin, starch, chitin, chitosan, filter paper, wood chip, etc. may be used. The carrier made of these materials can retain microorganisms thereon relatively mildly and thus allows easy release of microorganisms thus proliferated. The carrier is inexpensive and can act as a nutrient source for the microorganisms thus applied, particularly a nutrient source which can be gradually released to advantage.

In the invention, microorganisms capable of degrading soil contaminants are dispersed in soil while being supported on, i.e., fixed in a carrier. The method for fixing microorganisms of the invention is not limited in its kind and process so far as it can fix the biodegrading bacteria in such a manner that they cannot be discharged from the carrier. Specific examples of the fixing method employable herein include attached vital membrane method involving the use of a carrier which allows the attachment of microorganisms to form a vital membrane (microorganism layer), supported culture method involving the mixing of a carrier and a culture medium for the culture of microorganisms, method involving encapsulation of microorganisms in pores under reduced pressure, and a entrapping method involving encapsulation of microorganisms in gel. Preferred among these fixing methods are attached vital membrane method and entrapping method, particularly entrapping method.

The attached vital membrane method allows the enhancement of concentration of microorganisms and hence the enhancement of treatment efficiency. The attached vital membrane method also allows bacteria which proliferate at so low a rate that they are otherwise washed away to be retained in the system. The attached vital membrane method further allows microorganisms to be kept living in a stable manner.

The entrapping method allows bacteria to be kept in a high concentration, making it possible to enhance the treatment efficiency and fix bacteria which proliferate slowly. Further, this method allows bacteria to withstand fairly the change of conditions such as pH and temperature as well as high load. As such a entrapping method there may be used any method such as acrylamide method, agar-acrylamide method, PVA-boric acid method, PVA-refrigeration method, photo-setting resin method, acrylic synthetic polymer resin method, sodium polyacrylate method, sodium alginate method and K-carrageenan method so far as it allows encapsulation of microorganisms and provides so high a physical strength that it can be used over an extended period of time while microorganisms are being kept active in soil.

As a representative example of the entrapping method, the acrylamide method will be described hereinafter with reference to preparation of microorganism-fixed gel. The fixed gel is obtained by suspending bacteria (MLSS having a concentration as high as 20,000 ppm) in an acrylamide monomer solution containing a crosslinking agent (e.g., N,N'-methylenebisacrylamide), adding to the suspension a polymerization accelerator (e.g., N,N,N',N'-tetramethylethylenediamine) and a polymerization initiator (e.g., potassium persulfate), put the mixture in a forming mod having a diameter of 3 mm made of vinyl chloride tube or the like, subjecting the mixture to polymerization at a temperature of 20° C., extruding the polymerized product from the forming mold, and then cutting the polymerized product to a predetermined length. Since the pores on the surface of the solidified gel are smaller than bacteria, the bacteria which have been encapsulated and fixed in the pores can difficultly leak but proliferate and undergo degradation in the pores. Only contaminants in soil enter through the pores into the gel where they are then treated by the bacteria.

For details of these fixing methods, reference can be made to Ryuichi Sudo, "Biseibutu Koteikahou ni yoru Haisuishori (Disposal of waste water by microorganism fixing method)", Yuhei Inamori, "Seibutsumakuho ni yoru Haisuishori no koudo kouritsuka no doukou (Trend of enhancement and efficiency of disposal of waste water by vital membrane method)", Research of Water Contamination, vol. 13, No. 9, 1990, pp. 563–574, Yuhei Inamori et al, "Koudo suishori gijutsu kaihatsu no doukou kadai tenbou (Trend, problems and vision of technical development of high water disposal)", Service Water and Waste Water, vol. 34, No. 10, 1992, pp. 829–835, etc.

Further, the formation of a carrier by a biodegradable material is advantageous in that any problems arising from secondary contamination by residual carrier or the effect of applied microorganisms on the soil ecological system can be avoided. As such a biodegradable carrier there is preferably used a material which gradually decomposes and disappears after the remediation of soil by applied microorganisms. When such a carrier is used, applied microorganisms which have been released into soil after the disappearance of the carrier are then put in environments which are severe to growth such as competition with predominant native-born microorganisms in soil and predation by protozoan. The microorganisms are then driven out of soil and gradually decrease in number to extinction. As a result, the ecological system in soil can be restored to the original state.

In the case where the remaining of carrier and microorganisms incorporated therein in soil after the remediation of soil is problematic, the carrier may be at least partly formed by a biodegradable polymer material such as film or foamed product of bacteria cellulose and cellulose chitosan complex, microorganism polyester, polylactic acid, polylactone, polyglycylic acid, polymalic acid, starch-containing plastic, polycaprolactone, (hydroxylbutyric acid)-(hydroxyvalleric acid) copolymer, polyamino acid and polysaccharide polymer. In this arrangement, the carrier can undergo entire or essential degradation by microorganisms retained therein or living in soil. At the same time, the microorganisms which have been incorporated in the carrier gradually perish. Thus, such a problem can be solved. In this case, the material constituting the carrier, etc. are predetermined such that the degradation of the carrier begins almost at the same time with or after the disposal of soil.

Preferred examples of the biodegradable carrier material employable herein include cellulose-based carrier material such as Viscopearl (produced by Rengo Co., Ltd.) and carrier material comprising chitin or chitosan such as Chitopearl (produced by Fuji Spinning Co., Ltd.).

Preferred examples of the shape of carrier include substantial sphere, substantial cube, substantial rectangular parallelopiped, cylinder and tube. Particularly preferred among these shapes is substantial sphere, which can be easily produced, or substantial rectangular parallelopiped, which can be provided with a raised specific surface area. As a process for the production of such a carrier there may be used any known process. Examples of such a known process include a process which comprises adding a mixture of microorganisms and a carrier material (or precursor thereof) dropwise to a liquid which cannot dissolve the mixture therein so that the droplets are solidified therein to prepare a dispersion of carrier grains having microorganisms supported thereon, a process which comprises cooling a mixture of microorganisms and a carrier material (or precursor thereof) or adding to the mixture a gelling agent or solidifying agent to solidifying the mixture, and then cutting the solidified product to a proper size to obtain a rectangular parallelopiped grain having microorganisms supported thereon, a process which comprises extruding a mixture of microorganisms and a carrier material (or precursor thereof) through a nozzle into a liquid which cannot dissolve it therein so that it is solidified in the liquid to obtain a thread-like solidified carrier having microorganisms supported thereon, and then properly cutting the solidified product to prepare a cylindrical particle (grain), and a process involving the same steps as mentioned above except that the extrusion die is annular to obtain an annular (tubular) carrier particle having microorganisms supported thereon.

Referring to the size of the carrier particle, the outer diameter of the carrier grain is from 0.1 mm to 70 mm, preferably from 0.5 mm to 40 mm, more preferably from 1.0 mm to 10 mm. As the size of the carrier grain increases, the specific surface area of the carrier grain decreases, decreasing the efficiency. On the contrary, as the size of the carrier grain decreases, the carrier grain can decompose and disappear more readily and thus can no longer act as a carrier. Accordingly, the size of the carrier grain is properly predetermined depending on the soil to which the carrier is applied.

The water content of the carrier is from 1% to 99% by weight, preferably from 5% to 90% by weight, more preferably from 10% to 85% by weight. When the water content of the carrier is too low, microorganisms find difficultly in survival. On the contrary, when the water content of the carrier is too high, the resulting carrier exhibits a deteriorated physical strength that makes itself difficult to handle.

The temperature at which soil remediation is effected needs to be suitable for the action of microorganisms, i.e., from 3° C. to 50° C., preferably from 10° C. to 45° C., more preferably from 18° C. to 40° C. In order to keep the microorganisms within this temperature range, heating such as spraying and injection of hot water may be effected depending on the situation. In cold districts, a heat conductor may be inserted into soil so that heat from a heat source can be transferred to soil. Alternatively, the heat conductor inserted in soil may be electrically energized to heat soil. As such a heat conductor there may be used any material which can transmit heat such as metal and ceramics.

The pH value of soil to be remedied is normally from 2 to 10, preferably from 3 to 9, more preferably from 4 to 8.5, most preferably optimum pH for microorganisms. The measurement of the pH value of soil is preferably carried out by a pH measuring method commonly used in soil analysis. Essentially, a method may be employed which comprises adding thoroughly deaerated purified water to a soil sample in an amount of 2.5 times that of the soil sample, thoroughly stirring the mixture, and then measuring the pH value of the soil impregnated with water.

The application of the carrier having microorganisms supported thereon to soil can be accomplished by an ordinary method such as spraying and mixing with soil. The application of the carrier to soil at a relatively deep site can be accomplished by a method of applying and dispersing the preparation for remedying a soil through a provided digging hole.

The rate of degradation of the biodegradable carrier can be controlled by predetermining the material and properties of the biodegradable carrier. For example, the diameter and shape of pores in the carrier and the shape and size of the carrier may be properly predetermined taking into account the material of the carrier. The invention requires that the supply of nutrients be effected in such a manner that they are gradually released. Thus, the degradation rate of the biodegradable carrier needs to be so low that the gradual release conditions can be maintained. Examples of the factor which should be considered to affect the degradation rate in the predetermination of these requirements include the kind, amount and degradation activity of microorganisms (native-born microorganisms in soil or applied microorganisms) for degrading carrier, and the volume of soil to be treated. The period of time during which contaminants and carrier are degraded should be previously confirmed in a field experiment before the design of the carrier.

[Nutrients and How to Gradually Release them]

The nutrients and how to gradually release them will be described hereinafter.

As nutrients there are preferably used materials containing carbon, nitrogen and phosphorus. A culture solution suitable for the growth of microorganisms may be used. As such a culture solution there is widely used a material having a meat juice, a yeast extract, a malt extract, bactopeptone, glucose, inorganic salts, mineral, etc. in admixture at a proper ratio is widely used. These components may be mixed at a proper ratio depending on the kind of microorganisms. As the nutrients to be used in the invention there may be used any nutrients containing proper organic and inorganic nutrients besides the aforementioned culture solution. For example, a ground powder obtained by drying and grinding any microorganisms collected from natural world or which has been cultured may be used as a nutrient.

Further, comicroorganisms which activate degrading bacteria may be used. These comicroorganisms can become a nutrient source for degrading bacteria or secrete a material containing a component that activates degrading bacteria. Preferred examples of microorganisms include microorganism mixture commercially available as EM bacteria and photosynthetic bacteria. Particularly preferred among these bacteria are photosynthetic bacteria such as *Phoepseudomonas capsultata* and *Thiobacilluse definitricans*.

The invention is characterized in that the nutrients are supplied in such a manner that they are gradually released. As the gradual releasing method there may be used any method which allows the concentration of nutrients released from the carrier material to be kept at a scarcely variable level that is high enough to maintain survival and activity of microorganisms but low enough to prevent the deterioration of soil remedying function.

Specific examples of the gradual releasing method employable herein include a method which comprises allowing nutrients to be adsorbed, preferably chemically, to the surface of a carrier having grains dispersed and supported thereon in such an arrangement that they can be gradually released, a method which comprises granulating nutrients in admixture with a carrier material in such an arrangement that they can be gradually released, a method which comprises allowing nutrients to be occluded by a carrier material in such an arrangement that they can be gradually released, and an entrapping method which comprises encapsulating nutrients in a carrier material, e.g., gel in such an arrangement that they can be gradually released. Particularly excellent among these methods is entrapping method. The term "entrapping method" as used herein is as defined in "Gakujutsu Yougo Jiten (Dictionary of Scientific Terms)", compiled by Ministry of Education, Culture, Sports, Science and Technology, and "Hyoujun Kagakuyougo Jiten (Standard Dictionary of Chemical Terms)", compiled by The Chemical Society of Japan.

The entrapping method is characterized in that since the nutrient-supporting material can encapsulate nutrients therein in a high concentration and the copcentration of nutrients released therefrom can be controlled to a sufficiently low level, the microorganisms can be kept capable of degrading contaminants and provided with desired living conditions and the release of the microorganisms can last in a stable manner over an extended period of time, facilitating biological control. The entrapping method is identical with the aforementioned microorganism encapsulating solidifying method which is effective to solidify microorganisms in the reaction system in principle and is embodied substantially according to the encapsulating solidifying method. As the carrier material of entrapping method for encapsulating nutrients therein there may be used any material which can encapsulate nutrients therein and release the nutrients effectively and in a stable manner over an extended period of time to an extent such that the microorganisms can be kept active in the reactor, as in acrylamide method, agar-acrylamide method, PVA-boric acid method, PVA-refrigeration method, photo-setting resin method, acrylic synthetic polymer resin method, sodium polyacrylate method, sodium alginate method, K-carrageenan method, etc.

A representative example of the entrapping method will be described hereinafter with reference to preparation of nutrient gel in the case of acrylamide method. The nutrient-encapsulated gel is obtained by suspending nutrients (in a concentration of about 20,000 ppm) in an acrylamide monomer solution containing a crosslinking agent (e.g., N,N'-methylenebisacrylamide), adding to the suspension a polymerization accelerator (e.g., N,N,N',N'-tetramethylethylenediamine) and a polymerization initiator (e.g., potassium persulfate), put the mixture in a forming mold having a diameter of 3 mm made of a vinyl chloride tube or the like, subjecting the mixture to polymerization at a temperature of 20° C., extruding the polymerized product from the forming mold, and then cutting the polymerized product to a predetermined length. The release of the nutrients may be controlled, e.g., by adjusting the grain size of gelled product and the concentration of nutrients encapsulated in gel.

Specifically speaking, these entrapping methods may be effected according to the microorganism entrapping method described in the aforementioned references, i.e., Ryuichi Sudo, "Biseibutu Koteikahou ni yoru Haisuishori (Disposal of waste water by microorganism fixing method)", Yuhei Inamori, "Seibutsumakuho ni yoru Haisuishori no koudo kouritsuka no doukou (Trend of enhancement and efficiency of disposal of waste water by vital membrane method)", Research of Water Contamination, vol. 13, No. 9, 1990, pp. 563–574, Yuhei Inamori et al, "Koudo suishori gijutsu kaihatsu no doukou kadai tenbou (Trend, problems and vision of technical development of high water disposal)", Service Water and Waste Water, vol. 34, No. 10, 1992, pp. 829–835, etc.

As a method for supporting nutrients in such an arrangement that they can be gradually released other than entrapping method there may be used a method which comprises incorporating nutrients in a gel-like encapsulating carrier such as carrageenan and alginic acid in such an arrangement that they can be gradually released. An example of this method is a method which comprises (1) a step of mixing a solution containing nutrients and a solution containing a gelling material (carrageenan, alginic acid, etc.), and (2) a step of gelling the mixture while controlling the shape of the carrier to obtain a carrier.

As a further method for supporting nutrients in such an arrangement that they can be gradually released there may be used a method involving the use of a natural polymer having a slow biodegradation rate as a nutrient and carrier material. For example, a lignocellulose-based or chitin-based natural polymer may be applied in a granulated form having a diameter of from about 10 $\mu$m to 3 mm such that it can be gradually released at a proper rate.

The application of the carrier material encapsulating nutrients therein can be accomplished by the aforementioned methods for applying microorganism carrier such as spraying and mixing with soil. In order to apply the carrier material to soil at a relatively deep site, soil may be drilled to form a hole therein through which the carrier material is applied and dispersed. If the gradual releasing conditions can be satisfied, the carrier material encapsulating nutrients therein may be applied in admixture with microorganism carrier.

Another practical embodiment of the method which comprises supplying nutrients with the carrier having microorganisms supported thereon in such an arrangement that they can be gradually released is a method which comprises applying to contaminated soil a composite preparation containing a carrier having microorganisms supported thereon and sustained-release nutrients (gradually-releasable nutrients) for microorganisms.

The microorganism preparation is obtained by culturing desired microorganisms in a bioreactor, and then normally supporting the microorganisms on a carrier. The microorganisms thus obtained is supplied in this form as a preparation. In the invention, a composite microorganism preparation obtained by adding to such a microorganism preparation the aforementioned gradually-releasable nutrients is provided. Such a composite microorganism preparation is excellent in the stabilization of biological control and facilitation of working in the remediation of soil contaminated by difficultly-degradable contaminants to which the invention is applied.

As the carrier for supporting microorganisms there may be used a soil purifying microorganism preparation such as Biotrack DOL and SurfClean besides the aforementioned carrier. DC1738CW may be used for soil contaminated by surface active agents. As a preparation capable of degrading phenols such as methylphenol and cresol-based compounds there may be used DC1002CG or DC1738CW. The above-mentioned carriers were produced by Sybron Chemicals Japan Inc.

As the gradually-releasable nutrient supplier to be combined with the carrier having microorganisms supported thereon there may be used any of the nutrients rendered gradually-releasable by the aforementioned methods depending on contaminated soil to be treated.

The invention will be further described in the following examples, but the invention is not limited thereto.

The term "bacteria" as used hereinafter is meant to indicate "bacteria" classified as "microorganisms" described hereinabove and thus can be interpreted as having the same meaning as "microorganisms".

EXAMPLE 1

1 platinum loop of an EDTA-degrading bacterium *Bacillus editabidus*-1 (FERM P-13449) was subjected to static culture in 200 ml of a 1/30 M phosphoric acid buffering solution (pH 5.8) containing 0.5% by mass of polypeptone (produced by Kyokuto Seiyaku Co., Ltd.), 0.1% by mass of a yeast extract (produced by Wako Pure Chemical Industries, Ltd.) and 0.1% by mass of $NH_4Fe$ (III)EDTA (produced by Wako Pure Chemical Industries, Ltd.) as a basal medium at a temperature of 37° C. for 1 day to obtain a cultured product containing the bacterium in a high concentration.

The cultured product was then subjected to centrifugal separation so that it was divided into wet form of the bacterium and supernatant of cultured product. The wet form of the bacterium was then subjected three times to washing with purified water conforming the purity standard defined by the Japanese Pharmacopoeia and recovery of wet form of bacterium by centrifugal separation to obtain a washed wet bacterium sufficiently freed of supernatant. The wet bacterium was then redispersed in 80 ml of purified water. To the dispersion thus obtained was then added 10 g of modified Viscopearl AZ4200-cc (produced by Rengo Co., Ltd.) as a microorganism supporting carrier. The mixture was shaken with stirring for 1 hour, filtered, and then washed to remove unsupported bacteria. The carrier-supported bacterium thus obtained is referred to as "carrier-supported bacterium A").

Separately, a carrier-supported bacterium was prepared in the same manner as mentioned above except that the aforementioned culture medium was used instead of purified water. The carrier-supported bacterium thus obtained is referred to as "carrier-supported bacterium B"). The carrier-supported bacterium B contains a culture component as a nutrient source.

The washed wet bacterium at the stage shortly before the addition of the carrier in the preparation of the carrier-supported bacterium A is referred to as "washed wet bacterium C".

To 150 ml of the aforementioned basal medium was added agar to a concentration of 3%. The mixture was then heated to make a solution which was then cooled to obtain an agar gel. The agar gel was freeze-dried, and then ground to amass-average grain diameter of 10 μm by a ball mill to obtain a nutrient slow drug D. The amount of these preparations A to D each correspond to that to be applied to the following contaminated soil sample (200 g).

Soil collected from a green zone in Ashigara Factory of Fuji Photo Film Co., Ltd. was allowed to stand and dry at room temperature for 1 week. 2 kg of the soil thus dried was uniformly spread over a photographic tray (quarter size). 100 ml of a 1% solution of NH4Fe (III).EDTA (produced by Wako Pure Chemical Industries, Ltd.) was then sprayed onto the soil. The soil was then thoroughly mixed with the solution. The contaminated soil thus prepared was then allowed to stand and dry at room temperature for 1 week.

200 g of each of the samples of soil contaminated by EDTA was then inoculated with the various bacteria and nutrient sources prepared above (sprayed in the form of a thorough mixture with 150 ml of purified water or basal medium) as set forth in Table 1, and then observed for degradation of EDTA at 25° C. for 50 days. In some detail, as the vessel there was used a conical beaker. Every 5 days, purified water was added to the sample in an amount corresponding to evaporation loss determined by measurement of mass of the sample.

For the observation of degradation accelerator of EDTA, 5 g of soil was collected from each of the various samples, suspended in 50 ml of purified water, subjected to thorough dispersion and washing by an ultrasonic cleaner, and then subjected to filtration through a microfilter having a pore diameter of 0.45 μm to give a filtrate which was then subjected to ion chromatography to determine dissolved amount of EDTA. The results of test are shown in FIG. 1.

TABLE 1

| Sample No. | Bacterium | Nutrient source/ dispersion medium | Remarks |
|---|---|---|---|
| 1 | A | None/ purified water | |
| 2 | A | D/ purified water | |
| 3 | A | Basal medium | |
| 4 | B | None/ purified water | |
| 5 | B | D/ purified water | |
| 6 | B | Basal medium | |
| 7 | C | None/ purified water | 10 g of dried soil was added to coincide with the weight of sample comprising a carrier |
| 8 | C | D/ purified water | 10 g of dried soil was added to coincide with the weight of sample comprising a carrier |
| 9 | C | Basal medium | 10 g of dried soil was added to coincide with the weight of sample comprising a carrier |

As can be seen in FIG. 1, all Comparative Samples 3, 6 and 9, which have been cultured in a basal medium, show a high residual EDTA concentration even after 50 days of test, and Comparative Samples 1, 4 and 7, which have been provided with no nutrient sources, show a slightly higher residual EDTA concentration, demonstrating that all these comparative samples underwent little or no degradation of EDTA or, if any, degradation of EDTA to a percent biodegradation of less than 50%. On the other hand, Inventive Samples 2 and 5, carrier-supported bacteria provided with nutrients in the form of slow drug D, were degraded within the testing period until the residual EDTA concentration was substantially not detected. The two cases demonstrate that the bacteria can survive with a continuous effect of degrading EDTA under the conditions such that the supply of nutrients is restricted. Sample 8, which is provided with nutrients in the form of slow drug D but provided with a bacterium which is not supported on a carrier, showed a small drop of residual EDTA concentration within the testing period.

As can be seen in the aforementioned results of test, the embodiment of the invention which comprises supported biodegrading bacteria and provides a nutrient source in such an arrangement that it is gradually released allows effective biodegradation of EDTA in soil.

To add for reference, the carrier Viscopearl 1AZ4200-cc used in the present example is biodegradable and thus gradually degrades and disappears from the sludge thus tested.

EXAMPLE 2

The testing procedure of Example 1 was followed except that the EDTA-degrading *Bacillus editabidus*-1 (FERM P-13449) was replaced by an EDTA-degrading *Pseudomonas editabidus*-1 (FERM P-13634) described in Japanese Patent Laid-Open No. 1994-335386. The results of test made on the various samples on 9 levels of Example 2 obtained in the same manner as in 9 samples of Example 1 except that the kind of biodegrading bacteria was changed show that even if there is some difference in residual EDTA concentration among these samples, the relative difference among the 9 samples of Example 2 corresponds to the difference among the 9 samples of Example 1. In this sense, the difference among the 9 samples of Example 2 was substantially the same as that among the 9 samples of Example 1.

EXAMPLE 3

The testing procedure of Example 1 was followed except that the EDTA-degrading *Bacillus editabidus*-1 (FERM P-13449) was replaced by an EDTA-degrading *Bacillus editabidus*-M1 (FERM P-14868) described in Japanese Patent Laid-Open No. 1996-289778. The results of test made on the various samples on 9 levels of Example 3 obtained in the same manner as in 9 samples of Example 1 except that the kind of biodegrading bacteria was changed show that even if there is some difference in residual EDTA concentration among these samples, the relative difference among the 9 samples of Example 3 corresponds to the difference among the 9 samples of Example 1. In this sense, the difference among the 9 samples of Example 3 was substantially the same as that among the 9 samples of Example 1.

EXAMPLE 4

The testing procedure of Example 1 was followed except that the modified Viscopearl AZ4200-cc as carrier for supporting microorganisms was replaced by Chitopearl (produced by Fuji Spinning Co., Ltd.), which is based on Chitin (Chitosan). The results of test made on the various samples on 9 levels of Example 4 obtained in the same manner as in 9 samples of Example 1 except that the kind of biodegrading bacteria was changed show that even if there is some difference in residual EDTA concentration among these samples, the relative difference among the 9 samples of Example 4 corresponds to the difference among the 9 samples of Example 1. In this sense, the difference among the 9 samples of Example 4 was substantially the same as that among the 9 samples of Example 1.

EXAMPLE 5

A bacterium supported on cellulose powder was prepared in the same manner as in the preparation of the carrier-supported bacterium A except that the modified Viscopearl AZ4200-cc used in the preparation of the carrier-supported bacterium A was replaced by the equal part of a finely divided cellulose powder carrier (Microcarrier, produced by ASAHI CHEMICAL INDUSTRY CO., LTD.). The product is referred to as "carrier-supported bacterium E".

Separately, 0.1% by mass of a yeast extract (produced by Wako Pure Chemical Industries, Ltd.), 6.2 g of $Na_2HPO_4$, 3.0 g of $KH_2PO_4$, 0.5 g of NaCl and 11.0 g of $NH_4Cl$ were dissolved in 1 l of purified water to obtain an aqueous solution having a pH value of 7.0. To 500 ml of the aqueous solution was then added 3.0 g of the aforementioned finely divided cellulose powder. The solution was then subjected to concentration by evaporation and freeze drying to form a powder which was then ground to a mass-average grain diameter of 10 μm to obtain a nutrient slow drug F. The slow drug F gradually releases an inorganic nutrient as well as degraded cellulose powder and yeast extract occluded by cellulose.

The removal of EDTA was effected in the same manner as in Sample 2 of Example 1 except that the carrier-supported bacterium A was replaced by the carrier-supported bacterium E and the slow drug D was replaced by the slow drug F. After 50 days of test, no EDTA was detected in contaminated soil.

For comparative test, a supported nutrient G was prepared by increasing the amount of yeast extract (produced by Wako Pure Chemical Industries, Ltd.) from 0.1% by mass to 0.5% by mass in the preparation of the aforementioned slow drug F. The supported nutrient G instead of the nutrient slow drug F was subjected to 50 day test in the same manner as in the aforementioned examples. As a result, the percent residue of EDTA was 66% at 30th day and 35% at 50th day. This demonstrates that when nutrients are supplied excessively, EDTA can be difficultly degraded but is degraded at a raised rate in the latter half of the testing period during which the nutrients are consumed.

EXAMPLE 6

A phenol-degrading bacterium preparation Bi-Chem 1002CG available from Novozyme Inc. was cultured in 300 ml of a P1 medium (composition: 0.05% of yeast extract; 0.05% of phenol; 0.62% of sodium dihydrogenphosphate; 0.3% of potassium dihydrogenphosphate; 0.05% of sodium chloride; 0.1% of ammonium chloride; pH 7.0) with shaking at a temperature of 34° C. for 2 days to obtain a cultured product containing a phenol-degrading bacterium in a high concentration. The cultured product was then subjected to centrifugal separation so that it was divided into wet form of the bacterium and supernatant of cultured product. The wet form of the bacterium was then subjected three times to washing with purified water and recovery of wet form of bacterium by centrifugal separation to obtain a washed wet bacterium A sufficiently freed of supernatant.

κ-Carrageenan was dissolved in 160 ml of 37° C. purified water to a concentration of 4%. To the solution was then added the aforementioned washed wet bacterium A in an amount of half that mentioned above. The mixture was then thoroughly stirred and dispersed to make a uniform solution. The aforementioned κ-carrageenan solution was then added dropwise to a 2% KCl solution which had been kept at 20° C. in a 1 l beaker. Since κ-carrageenan stays liquid at 37° C. but is gelled at 20° C., this procedure makes it possible to obtain beads having a phenol-degrading bacterium encapsulated therein. These beads were then cultured in P1 medium for 1 day to obtain highly active beads having bacteria densely proliferated in the surface layer thereof. The beads thus obtained were then thoroughly washed with purified water to obtain beads B freed of excess medium component and unfixed bacterium. The encapsulation of components required for the growth of bacterium was carried out by heating 150 ml of P1 medium freed of phenol to a temperature of 37° C., adding κ-carrageenan to P1 medium to a concentration of 4%, and then adding the solution dropwise to a 20° C. 2% KCl solution. In this manner, beads C having the same shape as the aforementioned beads having bacterium encapsulated therein were obtained.

Soil collected from a green zone in Ashigara Factory of Fuji Photo Film Co., Ltd. was allowed to stand and dry at room temperature for 1 week. 1.5 kg of the soil thus dried was uniformly spread over a photographic tray (quarter size). 100 ml of a 2% phenol solution was then sprayed onto the soil. The soil was then thoroughly mixed with the solution. The contaminated soil thus prepared was then allowed to stand and dry at room temperature for 1 week.

200 g of each of the samples of soil contaminated by EDTA was then inoculated with bacteria and nutrient sources (sprayed in the form of a thorough mixture with 100 to 150 ml of purified water) as set forth in Table 2, and then observed for degradation of phenol at 25° C. for 30 days. In some detail, as the vessel there was used a conical beaker. Every 5 days, purified water was added to the sample in an amount corresponding to evaporation loss determined by measurement of mass of the sample. For the observation of degradation progress, 5 g of soil was collected from each of the various samples, suspended in 50 ml of purified water, subjected to thorough dispersion and washing by an ultrasonic cleaner, and then subjected to filtration through a microfilter having a pore diameter of 0.45 μm to give a filtrate which was then subjected to ion chromatography to determine dissolved amount of phenol.

In Table 2, the symbol a and b in the column of bacterium indicate 1/20 and 1/10 of the amount of the carrier-supported bacterium A, respectively, and C in the column of inoculation with nutrient source was used in an amount of 50 g.

TABLE 2

| Sample No. | Bacterium | Nutrient source/ dispersing water | Remarks |
|---|---|---|---|
| 1 | a | None/water | 15 g of dried soil was added to coincide with the weight of sample comprising a carrier |
| 2 | a | C/ water | 15 g of dried soil was added to coincide with the weight of sample comprising a carrier |
| 3 | a | 50 g of P1 medium/ water | 15 g of dried soil was added to coincide with the weight of sample comprising a carrier |
| 4 | b | None/ water | |
| 5 | b | C/ water | |
| 6 | b | 50 g of P1 medium/ water | |

The results of test are set forth in Table 3. In the results, the percent residue of phenol is used as an index of the biodegrading effect.

TABLE 3

| Sample No. | 1st day | after 10 days | after 20 days | after 30 days | Remarks |
|---|---|---|---|---|---|
| 1 | 90 | 89 | 88 | 88 | Comparative |
| 2 | 90 | 68 | 62 | 60 | Comparative |
| 3 | 88 | 70 | 65 | 63 | Comparative |
| 4 | 90 | 69 | 63 | 62 | Comparative |
| 5 | 89 | 58 | 42 | 29 | Inventive |
| 6 | 90 | 67 | 59 | 55 | Comparative |

EXAMPLE 7

The carrier-supported bacterium A and the nutrient slow drug D described in Example 1 were mixed at a mass ratio of 1:1. The mixture was then packed in a water-impermeable vessel to prepare a composite microorganism preparation comprising a carrier having a bacterium supported thereon and a nutrient slow drug. On the other hand, as a comparative sample there was used the carrier-supported bacterium B of Example 1. The carrier-supported bacterium B contains a medium component as a nutrient source.

Soil collected from a green zone in Ashigara Factory of Fuji Photo Film Co., Ltd. was allowed to stand and dry at room temperature for 1 week. 2 kg of the soil thus dried was uniformly spread over a photographic tray (quarter size). 100 ml of a 1% solution of $NH_4Fe(III).EDTA$ (produced by Wako Pure Chemical Industries, Ltd.) was then sprayed onto the soil. The soil was then thoroughly mixed with the solution. The contaminated soil thus prepared was then allowed to stand and dry at room temperature for 1 week.

200 g of each of the samples of soil contaminated by EDTA was then inoculated with the aforementioned composite microorganism preparation and the carrier-supported bacterium B (sprayed in the form of a thorough mixture with 150 ml of purified water), and then collected and analyzed to observe the degradation of EDTA at 25° C. for 50 days in the same manner as in Example 1.

The inventive microorganism preparation containing supported microorganisms and gradually-releasable nutrient source degraded EDTA in the contaminated soil until the residual EDTA concentration was substantially not detected within the testing period. The rate at which EDTA is degraded was substantially the same as that of Sample 2 of Example 1. On the contrary, the bacterium B used in the comparative example showed a high residual EDTA concentration even after 50 days of test, demonstrating that the results of Sample 4 of Example 1 were reproduced. In other words, it is made obvious that the microorganism preparation having a nutrient gradual releasing mechanism is capable of continuously remediating soil as in the case where a microorganism carrier and a gradually releasable nutrient source are separately applied. The results of the comparative example (supported bacterium B) show that even a form containing nutrients is not capable of degrading and removing contaminants unless it has a nutrient gradual releasing mechanism.

In accordance with the contaminated soil remedying method of the invention involving the presence of microorganisms supported on a carrier capable of degrading soil contaminants in contaminated soil and the application of nutrients for the microorganisms to the contaminated soil in such an arrangement that they can be gradually released, the contaminated soil can be effectively remediated without deteriorating the soil remediating capacity even if the nutrients are excessively supplied or without decreasing microorganisms even if the nutrients are in short supply. The aforementioned effect of the invention can be exerted also with an embodiment of microorganism preparation comprising a carrier-supported microorganism and a nutrient source containing a gradually releasable nutrient for microorganism in combination.

The entire disclosure of each and every foreign patent application from which the benefit of foreign priority has been claimed in the present application is incorporated herein by reference, as if fully set forth.

What is claimed is:

1. A method of remedying contaminated soil, which comprises:
    providing microorganisms capable of degrading soil contaminants to contaminated soil, in which the microorganisms are supported on a biodegradable carrier, wherein the microorganisms are supported on the carrier by an entrapping method of entrapping the microorganisms in gel as the carrier; and
    providing nutrients for the microorganisms to the contaminated soil on the condition that the nutrients can be gradually released, wherein the nutrients are entrapped in a separate biodegradable carrier material so that the nutrients can be gradually released.

2. The method of remedying contaminated soil as defined in claim 1, wherein the microorganisms capable of degrading soil contaminants include microorganisms capable of degrading at least one selected from the group consisting of EDTA, phenols and a surface active agent.

3. The method of remedying contaminated soil as defined in claim 2, wherein the microorganism capable of degrading soil contaminants includes an EDTA—decomposing bacteria.

4. The method of remedying contaminated soil as defined in claim 2, wherein the microorganism capable of degrading soil contaminants includes a surfactant decomposing bacteria.

5. The method of remedying contaminated soil as defined in claim 1, wherein the carrier in the entrapping method is an acrylamide gel.

6. The method of remedying contaminated soil as defined in claim 1, wherein the biodegradable carrier contains at least biodegradable polymer material.

7. The method of remedying contaminated soil as defined in claim 1, wherein the biodegradable carrier is selected from the group consisting of cellulose-containing carrier material and at least one carrier material selected from the group consisting of chitosan and chitin.

8. The method of remedying contaminated soil as defined in claim 1, wherein the carrier supporting the microorganisms capable of degrading soil contaminants has a form of a particle.

9. The method of remedying contaminated soil as defined in claim 8, wherein the carrier particle supporting the microorganisms capable of degrading soil contaminants has the outer diameter of from 0.1 mm to 70 mm.

* * * * *